United States Patent [19]

Keil et al.

[11] 4,269,619
[45] May 26, 1981

[54] ILMENITE BENEFICIATION PROCESS AND A DIGESTER METHOD

[75] Inventors: Howard R. Keil; Oscar L. Daigle, both of Oklahoma City, Okla.

[73] Assignee: Kerr-McGee Chemical Corporation, Oklahoma City, Okla.

[21] Appl. No.: 686,267

[22] Filed: May 14, 1976

[51] Int. Cl.³ .......................... C22B 3/00; C22B 3/02
[52] U.S. Cl. ........................................ 75/1 T; 75/114; 266/44; 266/143; 266/165
[58] Field of Search ...................... 75/1, 1 T, 114; 266/101, 169, 165, 143, 142, 44; 105/238 R, 358, 350, 367, 1 A, 364; 214/17 R, 18 R, 507; 241/15, 21

[56] References Cited

U.S. PATENT DOCUMENTS

| | | | |
|---|---|---|---|
| 673,167 | 4/1901 | Giffen . | |
| 697,688 | 4/1902 | Stelzer . | |
| 1,039,010 | 9/1912 | Bandsley | 23/269 |
| 1,063,951 | 6/1913 | Blount | 23/269 |
| 1,074,282 | 9/1913 | Mitchell | 266/165 |
| 1,150,669 | 8/1915 | Fleming | 266/101 |
| 1,215,565 | 2/1917 | Malm | 23/269 |
| 1,248,560 | 12/1917 | Shatto | 23/269 |
| 1,372,119 | 3/1921 | Congleton . | |
| 1,799,481 | 4/1931 | Sanger et al. | 23/269 |
| 1,807,232 | 5/1931 | Wurster et al. | 23/269 |
| 1,823,813 | 9/1931 | Wurster | 23/269 |
| 2,000,696 | 5/1935 | Friend et al. | |
| 2,076,321 | 4/1937 | Pick | 251/31 |
| 2,089,054 | 11/1937 | McBerty | 23/269 |
| 2,089,535 | 8/1937 | Cave | 210/180 |
| 2,239,608 | 4/1941 | Huzenlaub et al. | 99/237 |
| 2,297,311 | 9/1942 | Mead et al. | 209/3 |
| 2,306,926 | 12/1942 | Allen | 141/1 |
| 2,363,177 | 11/1944 | Haffner | 62/1 |
| 2,370,614 | 3/1945 | Böhm | 23/269 |
| 2,390,388 | 12/1945 | Rector | 23/269 |
| 2,409,408 | 10/1946 | Tweeddale | 23/267 S |
| 2,474,006 | 6/1949 | Maycock | 261/83 |
| 2,655,287 | 10/1953 | Campbell | 222/123 |
| 2,661,244 | 12/1953 | Baily | 202/13 |
| 2,690,715 | 10/1954 | Pope | 222/189 |
| 2,776,877 | 1/1957 | Cardon | 23/269 |
| 2,875,039 | 2/1959 | Bachmann | 75/114 |
| 2,917,768 | 12/1959 | Walberer | 15/304 |
| 3,151,845 | 10/1964 | Leuze | 259/30 |
| 3,314,730 | 4/1967 | Anderson et al. | 302/14 |
| 3,400,984 | 9/1968 | Shellene et al. | 302/14 |
| 3,512,842 | 5/1970 | Milewski et al. | 302/66 |
| 3,527,384 | 9/1970 | Koyama et al. | 222/1 |
| 3,545,619 | 12/1970 | Ettlich et al. | 210/196 |
| 3,547,497 | 12/1970 | Bolger | 302/66 |
| 3,552,799 | 1/1971 | Koranda | 302/14 |
| 3,749,370 | 7/1973 | Clech et al. | 259/10 |
| 3,787,035 | 1/1974 | Bryson et al. | 259/16 |
| 3,799,620 | 3/1974 | Robinson et al. | 302/15 |
| 3,825,419 | 7/1974 | Chen | 75/114 |

FOREIGN PATENT DOCUMENTS

| | | | |
|---|---|---|---|
| 725482 | 9/1942 | Fed. Rep. of Germany | 23/269 |
| 882841 | 5/1953 | Fed. Rep. of Germany | 23/290.5 |
| 530477 | 2/1921 | France | 23/269 |
| 881824 | 5/1942 | France . | |
| 2009048 | 1/1970 | France . | |
| 47934 | 10/1939 | Netherlands | 23/269 |
| 431375 | 8/1967 | Switzerland . | |
| 5709 | of 1915 | United Kingdom | 23/269 |
| 110609 | 10/1917 | United Kingdom . | |
| 177628 | 4/1922 | United Kingdom . | |
| 1007946 | 10/1965 | United Kingdom | 23/290 |

*Primary Examiner*—Michael L. Lewis
*Attorney, Agent, or Firm*—William G. Addison

[57] ABSTRACT

An improved digester method and apparatus particularly useful in the digestion stage of a process for the beneficiation of titaniferous iron ores and the like. A discharge nozzle is connected to a portion of the digester and the digested material is pumped from the digester via a pump connected to the discharge nozzle. In one aspect, fluid from a fluid source is passed through a portion of the discharge nozzle and into the interior of the digester for dislodging any solid-like masses prior to discharging the digested material and, in another aspect, fluid from the fluid source is passed into the discharging digested material from the digester.

13 Claims, 5 Drawing Figures

ILMENITE BENEFICIATION PROCESS AND A DIGESTER METHOD

BACKGROUND OF THE INVENTION

1. Field of the Invention

The present invention relates generally to improvements in and methods for operating a digester. More particularly, but not by way of limitation, the invention relates to an improved digester discharge apparatus and method for discharging a digester.

2. Brief Description of the Prior Art

In the past, various forms of vessels constructed to facilitate the digestion of certain materials have been proposed. Some of these vessels have included various types of devices constructed to effect the discharge of the material retained within the process vessel.

U.S. Pat. No. 2,297,311, issued to Mead, et al. discloses a device for pumping a slurry from a feed tank wherein a secondary fluid is fed into the pump suction to reduce the solids content in the suction line.

U.S. Pat. No. 2,661,244, issued to Baily, discloses an apparatus for feeding solid particulate material by diluting the material to a suspension of light density so the material can be transported through pipelines. U.S. Pat. No. 3,314,730, issued to Anderson, et al., discloses forming a stable suspension of granular phosphate in water for transportation via pipelines wherein the solid materials are discharged from hoppers into a water intake line.

U.S. Pat. No. 3,552,799, issued to Koranda, discloses a device for unloading dry materials from a railroad car wherein a liquid is discharged into the railroad car and into contact with the dry material, thereby creating a slurry within the railroad car for facilitating the removal of the material.

U.S. Pat. No. 2,239,608, issued to Huzenlaub, et al., discloses a rotatably mounted vessel wherein water impregnation, steam treatment or air and fluid evacuation are utilized to prevent clogging of the orifices.

U.S. Pat. No. 3,400,984, issued to Shellene, et al., discloses a system for continuously pumping a highly viscous fluid stream containing solids such as wood chips, coal or potash. The patent states that a solid may be pumped through a pipeline by admixing fragmentized particles of the solid with a fluid carrier. In that patent, the slurry is diluted to a pumping consistency; the apparatus includes a back-flushing system for periodically cleaning the downstream filler apparatus.

U.S. Pat. No. 2,306,926, issued to Allen, discloses solid lumps of material being conveyed hydraulically via a water inlet pipe into a sump. A pump is connected to the sump for pumping the solid material therefrom.

U.S. Pat. No. 3,799,620, issued to Robinson, et al., discloses a railroad car carrying particulate material wherein the car is positioned over a pit and a nozzle is elevated into contact with the railroad car, a liquid nozzle being inserted within the railroad car via the nozzle for releasing high pressure steam and forming a pumpable slurry with the particulate material. The slurry is discharged from the railroad car via gravity.

U.S. Pat. No. 3,512,842, issued to Milewski, et al., discloses a method for unloading dry bulk powder from a hopper car.

Other devices and methods generally related to the movement of solid materials through a conduit or the like are disclosed in the following patents: U.S. Pat. Nos. 2,000,696, issued to Friend, et al.; 2,655,287, issued to Campbell; 3,151,845, issued to Leuze; 697,688, issued to Stelzer; 673,167, issued to Giffen; 3,749,370, issued to Clech, et al.; 3,547,497, issued to Bolger; 2,690,715, issued to Pope; 2,363,177, issued to Haffner; 2,917,768, issued to Walberer; 2,474,006, issued to Maycock; 2,089,535, issued to Cave; 3,545,619, issued to Ettlich, et al.; 2,076,321, issued to Pick; 1,372,119, issued to Congleton, Dec'd.; 3,787,035, issued to Bryson, Jr., et al.; 3,527,384, issued to Susugu Koyama, et al.; French Pat. Nos. 881,824; 2,009,048; Great Britian Pat. Nos. 177,628; 110,609, issued to Bell; Swiss Pat. No. 431,375.

SUMMARY OF THE INVENTION

The present invention contemplates an improved digester, an improved method for discharging a digester and an improved process for the beneficiation of titaniferous iron ores and the like. The digester is mounted movably and includes a discharge nozzle in fluidic communication with the interior of the digester. A pump is connectable to the discharge nozzle for pumping the digested material from the interior of the digester. In one aspect, a fluid source is connectable to the discharge nozzle for clearing the discharge nozzle and the opening between the discharge nozzle and the interior of the digester prior to discharging the digested material and, in another aspect, a fluid source is connectable to the discharge nozzle for passing fluid into the discharging digested material to facilitate the pumping of the digested material from the digester.

In operation, the digester is moved to a material receiving position; the digester is charged with the material to be digested; the material in the digester is digested; the digester is moved to a material discharge position; and the digested material is discharged from the digester. After the digester has been moved to the material discharge position, the fluid source is connected to the discharge nozzle and fluid from the fluid source is backwashed through the discharge nozzle into the interior of the digester for clearing the discharge path prior to the discharging of the digested material. The fluid source is connected between the digester and the pump and the fluid from the fluid source is pumped through the pump for starting the operation of the pump. The digested material is discharged from the digester by pumping the digested material from the digester via the pump, fluid being added to the discharging digested material from the fluid source to facilitate the pumping of the digested material from the digester and through the pump.

The present invention provides an improved process for the beneficiation of titaniferous iron ores and the like wherein the material is passed from a continuous type of process into a digester for digestion in a batch type of operation and subsequently the digested material is discharged from the digester via a pump to downstream apparatus for further processing in a continuous type of process.

DESCRIPTION OF THE PREFERRED EMBODIMENTS

Figure 1:
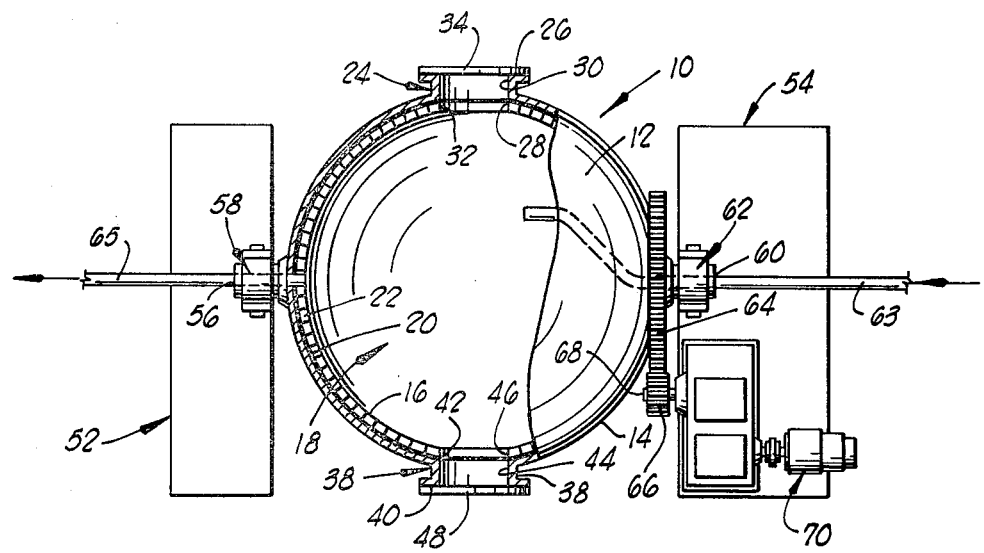
FIG. 1 is a partial sectional, partial elevational, plan view of the digester of the present invention.

In one presently utilized ilmenite beneficiation process for upgrading the titanium dioxide ($TiO_2$) content of the ilmenite, the raw ilmenite is transferred to a reduction kiln wherein a portion of the ferric iron content is reduced to the ferrous state after which the reduced ilmenite is cooled and charged into a digester. In the digester, hydrochloric acid (leach liquor) is added and a hydrochloric acid vapor is introduced for heating purposes. After the digestion is completed, the spent acid (leach liquor) is removed from the digester and water is added to wash the ilmenite. The spent acid is processed through an acid regeneration, sub-process wherein solid products are removed and the hydrochloric acid is recovered for recycle back to the digester. The water is removed from the digester and the digester is moved to a position whereby the digested material may be discharged via gravity into a trough from which it is discharged for further processing. The digested ilmenite is dewatered, washed, calcined and cooled to produce the beneficiated ilmenite having a titanium dioxide ($TiO_2$) content of about ninety to ninety-five percent (90% to 95%). A process for the beneficiation of titaniferous iron ores such as just has been described is disclosed in U.S. Pat. No. 3,825,419, issued to Chen.

One type of digester presently is utilized in the beneficiation of titaniferous iron ores comprising a generally spherically shaped, hollow shell or housing lined with a rubber lining covered with acid-resistant bricks. A feed manhole (nozzle) is formed in the housing with a removable cover connected thereto for closing the manhole. The digester is rotatably mounted. In operation the digester is rotated to a position wherein ilmenite is charged thereinto through the feed manhole after the cover is removed from the manhole. Thereafter, the cover is replaced and the digester is rotated during the digestion stage of the process. After completion of the digestion, the cover is removed from the feed manhole, and the digester is rotated to a position wherein the digested ilmenite is allowed to flow out through the open feed manhole via gravity. The digested ilmenite discharging from the digester is received in a trough and guided into a surge tank or a sump prior to filtering, calcining and cooling of the ilmenite. In some instances, the trough is washed with water from a hose to encourage the continuous flow of the ilmenite through the trough.

Utilization of the present invention now makes it unnecessary to remove the acid wash fluid from the digester prior to discharging the digested titaniferous iron ores and the like and, even in those instances where the digestion or leaching is accomplished in two or more stages, it is no longer necessary to remove or decant the acid wash fluid utilized in the last digestion stage prior to discharging the digested titaniferous iron ores and the like. Thus, this invention provides a more economical and more efficient process since it eliminates the final decanting step in the digestion stage and thereby reduces the time required for the digestion stage i.e., it provides an overall reduction in the total cycle time required to process the titaniferous iron ores or the like. The total cycle time is reduced in accordance with the present invention as a result of the reduction in the amount of time required to discharge the digested material from the digester. In addition, the digested material may be discharged from the present digester in a manner which results in reduced pipe plugging and pumping problems. The discharging material may be connected directly to the downstream process apparatus whereby the movement of the digested material from the batch type process of the digester to the continuous type downstream apparatus is accomplished in a more efficient manner. The present invention also results in reduced space requirements for storing and accommodating the apparatus necessary to discharge the digester.

It will be appreciated that, in one aspect, the present invention provides an improved process for the beneficiation of titaniferous iron ores and the like and, in another aspect, provides an improved process for operating an improved digester provided with improved discharge apparatus.

Figure 2:
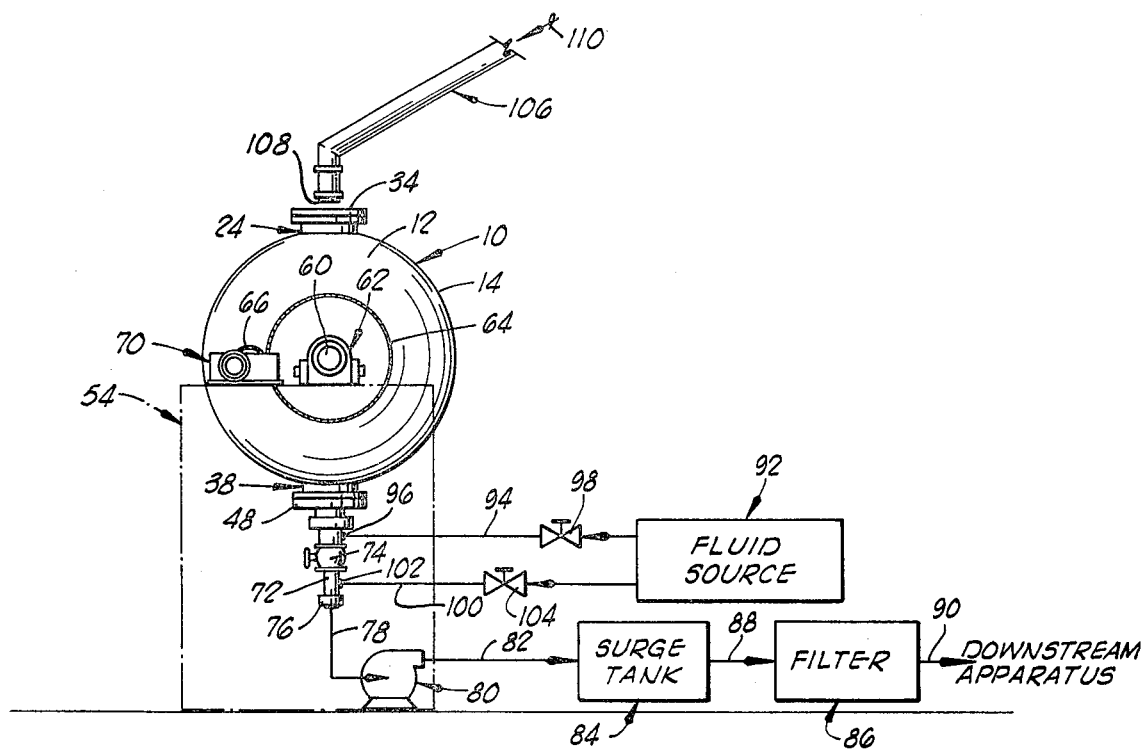
FIG. 2 is a side elevational view of the digester of FIG. 1, including a diagrammatic, schematic view of the apparatus for discharging the digested material from the digester.

Referring more particularly to FIGS. 1 and 2, shown therein and designated via the general reference numeral 10 is a digester constructed in accordance with the present invention. The digester 10 includes a spherically shaped shell or housing 12 having an outer surface 14, an inner surface 16 and an open space defining what is sometimes referred to herein as the interior 18 of the digester 10. In one form, as shown in the drawings, the inner surface 16 of the shell 12 is lined with a liner 20 constructed of an elastomeric material and the liner 20 is covered via a plurality of acid-resistant bricks 22. The liner 20 and the bricks 22 illustrate a construction particularly adapted for use in the digestion stage of a process for the beneficiation of titaniferous iron ores, as herein described. In other applications, the liner 20 and the bricks 22 may not be necessary.

The shell 12 includes a first nozzle 24, having opposite ends 26 and 28 and an opening 30 extending therethrough intersecting the opposite ends 26 and 28. The first nozzle 24, whose end 28 is connected to the shell 12, is positioned on the shell 12 in such manner that the opening 30 is aligned with a first opening 32 formed through the shell 12 and communicating with the interior 18 of the shell 12 via the first opening 32.

A first cover 34 is connected removably to the first nozzle 24, generally near the end 26 thereof. The first cover 34 is sized and positionable on the first nozzle 24 to encompass and cover the opening 30 when connected to the first nozzle 24.

In one embodiment, the shell 12 also includes a second nozzle 38, having opposite ends 40 and 42 and an opening 44 extending therethrough intersecting the opposite ends 40 and 42. The second nozzle 38, whose end 42 is connected to the shell 12, is positioned on the shell 12 in such manner that the opening 44 is aligned with a second opening 46 formed through the shell 12 and communicating with the interior 18 of the shell 12 via the second opening 46. In one form as shown in FIGS. 1 and 2, the second nozzle 38 is oriented on the shell 12 generally opposite the first nozzle 24 or, in the case of a spherically shaped shell 12, generally one-hundred and eighty degrees (180°) from the first nozzle 24.

A second cover 48 is removably connected to the second nozzle 38, generally near the end 40 thereof, via a plurality of bolts (not shown in the drawings). The second cover 48 is sized and positionable on the second nozzle 38 to encompass and cover the opening 44 when connected to the second nozzle 38.

It should be noted that various other forms of covers and various means for removably connecting the covers to nozzles are well known in the art and may be suitable for use in connection with the present invention in lieu of the covers 34 and 48 which are connected to the nozzles 24 and 38 via the bolt fasteners. It should also be noted that the nozzles 24 and 38 are sometimes referred to in the art as "manholes".

In one preferred type of installation, the digester 10 is rotatably supported between a pair of spaced apart cooperative members including a first and a second mounting structure 52 and 54. The structures may be formed of concrete or other suitable material of construction.

One end of a first shaft 56 is secured to outer surface 14 of the shall 12 and the first shaft 56 extends a distance from the shell 12. The end of the first shaft 56, opposite the end connected to the shell 12, is journally connected to a journal support 58, the journal support 58 being connected to and supported on a portion of the first mounting structure 52.

One end of second shaft 60 is secured to the outer surface 14 of the shell 12 and the second shaft 60 extends a distance from the shell 12. The end of the second shaft 60, opposite the end connected to the shall 12, is journally connected to a journal support 62, the journal support 62 being connected to and supported on a portion of the second mounting structure 54.

A driven gear 64 is secured to the outer wall of shell 12. A driving gear 66 is connected gearingly to the driven gear 64 and the driving gear 66 is connected through a gear reduction unit to a driver 70, such as, for example, an electric motor or a turbine or other such driver type apparatus. The driver 70 has an "on" and an "off" condition and, in the "on" condition, the driver 70 rotatingly drives the driving shaft 68 and the driving gear 66 connected thereto. As the driving gear 66 is rotatingly driven, the driven gear 64 is rotated via the gearing connection between the gears 64 and 66, thereby rotating the second shaft 60 and the digester 10.

The second cover 48 (FIG. 2) has an opening (not shown in the drawings) formed through a central portion thereof providing communication with the interior 18 of the shell 12. One end of a discharge nozzle 72 is connected to the second cover 48 and positioned such that the opening through the discharge nozzle 72 is in fluidic communication with the interior 18 or the shell 12 via the opening in the second cover 48. A discharge valve 74 is interposed in the discharge nozzle 72 and a quick-disconnect type of coupling 76 is connected to the end of the discharge nozzle 72, opposite the end of the discharge nozzle 72 which is connected to the second cover 48.

One end of a conduit 78 is connected to the suction side of a pump 80 and the opposite end of the conduit 78 is removably connected to the discharge nozzle 72 via the coupling 76. Thus, the pump 80 is in fluidic communication with the interior 18 of the shell 12 via the conduit 78 and the discharge nozzle 72 when the discharge valve 74 is in an opened position. Such fluidic communication being interrupted, of course, when the discharge valve 74 is in the closed position.

One end of a conduit 82 is connected to the discharge side of the pump 80, the opposite end being connected to a surge tank 84. The surge tank 84 is connected to a filter 86 via a pump (not shown) and a conduit 88 and the filter 86 is connected to the downstream apparatus (not shown in the drawings) via a discharge chute 90.

A fluid source 92 is connected to the discharge nozzle 72 via a conduit 94, generally between the discharge valve 74 and the shell 12. In one preferred embodiment, the conduit 94 is removably connected to the discharge nozzle 72 via a quick-disconnect type of coupling 96. A first valve 98 is interposed in the conduit 94, and fluidic communication between the fluid source 92 and the interior 18 is established via the conduit 94 when valve 98 is in the open position. Such fluidic communication is interrupted, of course, when valve 98 is in the closed position.

A conduit 100 connects fluid source 92 to the discharge nozzle 72 which is located between the discharge valve 74 and the pump 80. In one preferred embodiment, the conduit 100 is removably connected to the discharge nozzle 72 via a quick-disconnect type of coupling 102. A second valve 104 is interposed in the conduit 100, and fluidic communication between the fluid source 92 and the pump 80 is established when valve 104 is in the open position. Such fluidic communication is interrupted, of course, when valve 104 is in the closed position.

An intake pipe 106 is partially shown in FIG. 2. One end 108 of the intake pipe 106 is disposed generally above the shell 12. The intake pipe 106 is movably positionable to one position for receiving the material to be digested (diagrammatically shown in FIG. 2 via the arrow designated via the numeral 110) and discharging the material to be digested through the end 108 into the interior 18 of the shell 12.

In one form, the digester 10 includes a blind flange (not shown) constructed similar to the first cover 34. The blind flange is connected removably to the second nozzle 38 to prevent the material within the interior 18 from being discharged through the second nozzle 38 during the digestion of such material. In this type of construction, the blind flange is removed and the second cover 48 is connected to the second nozzle 38 for discharging the digested material from the interior 18.

It should be noted that the digester 10 also may be provided with other openings in communication with the interior 18 for introducing other liquids and vapors into the interior 18 during the digestion of the material. The construction of a digester including the various other openings and the location of the various other openings are well known in the art and it is not deemed necessary to include such in the present drawings.

Operation of FIGS. 1 and 2

To initiate the digestion of material, either the blind flange (not shown) is connected to the second nozzle 38 or the discharge valve 74 is closed. The conduits 78, 94 and 100 are each disconnected from the discharge nozzle 72. The digester 10 is rotated via the driver 70 to a material receiving position wherein the first nozzle 24 is oriented to receive the material to be digested, as shown in FIG. 2, and the first cover 34 is removed. The intake pipe 106 is moved to a position in which the end 108 generally is disposed above the opening 30 in the first nozzle 24 and the material to be digested is passed through the intake pipe 106 into the interior 18 via the opening 30 in the first nozzle 24.

After the digester 10 has been charged with the dry material to be digested, the first cover 34 is secured to the first nozzle 24 thereby closing the opening 30. Hydrochloric acid and hot vapors of hydrochloric acid then are introduced into the interior 18 of the shell through pipe 63. The driver 70 then is placed in the "on" condition to thereby rotate the shell 12 about the first and the second shafts 56 and 60.

After completion of the digestion, spent acid is removed from digester 10 through pipe 65 and conveyed to the acid regeneration station (not shown). Wash fluid is then introduced into the interior 18 of the digester through pipe 63. The digester is rotated for an adequate period of time to provide proper washing of the digested material and then stopped in the proper position wherein the second nozzle 38 is oriented in a manner permitting the flow of the digested material via gravity from the interior 18 and through the discharge nozzle 72 via the opening 44 in the second nozzle 38. When the digester shell 12 is in this position, the conduit 78 then is connected to the discharge nozzle 72 via the coupling 76, the conduit 94 is connected to the discharge nozzle 72 via the coupling 96 and the conduit 100 is connected to the discharge nozzle 72 via the coupling 102.

The second valve 104 then is opened thereby providing fluidic communication between the fluid source 92 and the suction side of the pump 80 via the conduit 100, the discharge nozzle 72 and the conduit 78, the discharge valve 74 being closed. The pump 80 is placed in the "on" condition for pumping or passing fluid from the fluid source 92 therethrough, the pumped fluid being discharged from the pump 80 via the conduit 82. The pumping of fluid from the fluid source 92 via the pump 80 serves to remove particles of foreign matter from the interconnecting conduits and the pump 80 and, in essence, starts the pumping operation of the pump 80.

Thereafter, the first valve 98 is opened thereby providing fluidic communication between the fluid source 92 and the interior 18 via the conduit 94, the discharge nozzle 72 and the opening 44 through the second nozzle 38. Fluid from the fluid source 92 is passed into the interior 18 via the opening 44 in the second nozzle 38 thereby backwashing the fluid through the discharge nozzle 72 and through the opening 44. The backwashing of fluid through the opening 44 tends to break-up any solid-like masses of the digested material which might exist about the intersection of the opening 46 with the interior 18 of the digester shell 12.

After backwashing fluid through the opening 44 in the second nozzle 38, the discharge valve 74 is opened thereby establishing fluidic communication between the interior 18 and the pump 80 via the discharge valve 74, the discharge nozzle 72 and the conduit 78. The first valve 98 may then be partially or totally closed to limit the flow of fluid from the fluid source 92 through the first valve 98. Since the pump 80 still is in the "on" condition, the digested material is pumped from the interior 18 of the digester shell 12 via the pump 80 into conduit 82.

In addition to the digested material, a predetermined amount of fluid from the fluid source 92 is pumped through the pump 80 via the partially opened second valve 104. The fluid from the fluid source 92 enhances and facilitates the continuous flow of digested material through the pump 80. Further, the flow of fluid from the fluid source 92 substantially reduces the possibilities of solid matter build-up within the discharge nozzle 72, the conduit 78 and pump 80 during the discharging of the digested material from the digester interior 18.

The digested material is discharged from the pump 80 into the surge tank 84 wherein the solids (the digested material) are partially dewatered and the solids are passed through the filter 86 to the downstream apparatus for further processing in a manner generally described before with respect to the process for the beneficiation of titaniferous iron ores.

After the digested material has been discharged substantially completely from the interior 18 of the digester shell 12, the pump 80 is placed in the "off" condition, the second valve 104 is closed, the discharge valve 74 is closed, and the conduits 78, 94 and 100 are each disconnected from the discharge nozzle 72 via the couplings 76, 96 and 102, respectively. In this condition, the digester 10 is ready to be rotated to receive additional material to be digested in a manner described before.

In those instances where it is not desirable to leave the discharge nozzle 72 connected to the second nozzle 38 during the digestion of the material within the digester interior 18, the discharge nozzle 72 and the discharge valve 74 interposed therein are disconnected by removing the second cover 48 and replacing the cover with a blind flange (not shown) which is connected to the second nozzle 38 to thereby close the opening 44. After the blind flange has been secured to the second nozzle 38, the material to be digested is charged into the digester interior 18 in a manner described above.

After the digested material has been discharged from the digester interior 18, it may be desirable to open the first valve 98 and the discharge valve 74, and condition the pump 80 in the "on" condition to pump fluid from the fluid source 92 through the discharge valve 74 to thereby flush out any solid materials which might have become lodged within the discharge valve 74.

Referring more particularly to the process for the beneficiation of titaniferous iron ores such as ilmenite, the ore first is roasted in a reduction kiln to convert a substantial portion of the ferric iron to the ferrous state, after which the reduced ilmenite is cooled and then charged into the interior 18 via the intake pipe 106 and the opening 30 through the first nozzle 24.

After the digestion of the ilmenite has been completed, the spent acid is removed from the digester interior 18 and wash fluid is passed into the digester interior 18 for washing the digested ilmenite. Utilizing the present invention, it is not necessary to remove the wash fluid from the digester interior 18 prior to discharging the digested ilmenite therefrom. Rather, after the digested ilmenite has been washed, both it and the wash fluid are pumped from the digester interior 18 via the pump 80 in the manner described before.

It will be appreciated that the acid and acid vapors added to the digester interior 18 impose rather severe operating conditions on discharge valve 72. Therefore, it is desirable to connect the blind flange (not shown) to the second nozzle 24 during the digestion stages. After digestion, the blind flange is removed and the second cover 48 is connected to the second nozzle 24 along with the discharge nozzle 72 and the discharge valve 74 for cooperation in removing the digested ilmenite from the digester interior 18. In this manner, the discharge valve 74 is not exposed to the acid or the acid vapors during the digestion of the ilmenite.

Figure 3:
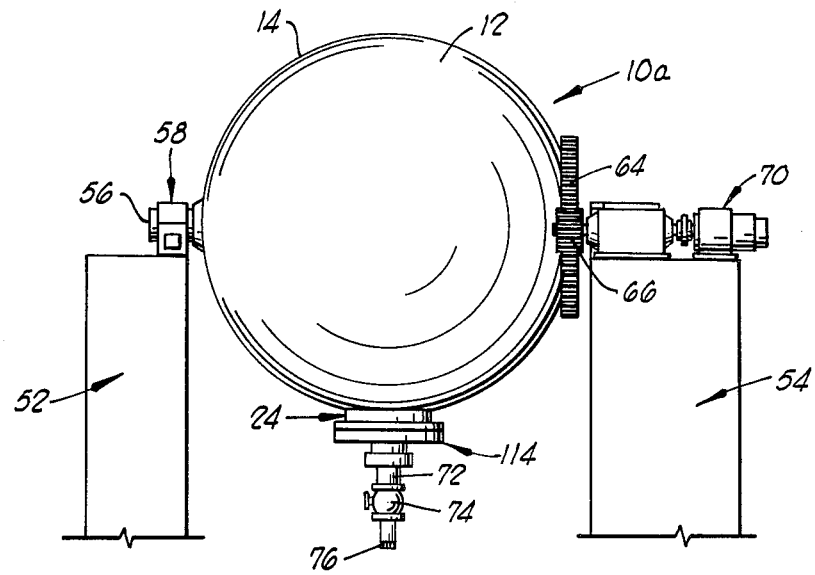
FIG. 3 is a front elevational view of a modified digester.
Figure 4:
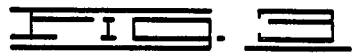
FIG. 4 is a partial sectional, plan view showing the movable cover of the modified digester of FIG. 3.

Embodiment of FIGS. 3 and 4

A modified digester 10a is shown in FIGS. 3 and 4. It is constructed exactly like the digester 10 described in detail before, except digester 10a does not include a second nozzle such as the second nozzle 38 of the digester 10. A movable cover 114 is connected pivotally in directions 118 or 120 about the pivot connector 116.

When the movable cover 114 is pivoted to a position wherein it substantially covers the opening 30, the movable cover 114 is secured in such position to the first nozzle 24 via a plurality of bolt fasteners (not shown in the drawings).

The discharge nozzle 72 is connected to the movable cover 114 in a manner exactly like that described before with respect to the connection between the discharge nozzle 72 and the second cover 48. An opening 121 is formed through the movable cover 114 for providing fluidic communication between the discharge nozzle 72 and the opening 30 of the first nozzle 24 exactly like that described before with respect to the discharge nozzle 72 and the opening 44 in the second nozzle 38.

The digester 10a operates in a manner similar to that described before with respect to the digester 10, the salient difference being that the material to be digested is charged into the digester 10a via the opening 30 in the first nozzle 24 and the digested ilmenite is pumped from the digester 10a interior 18a via the opening 30 in the first nozzle 24 and the discharge nozzle 72 connected thereto.

When utilizing the method and the apparatus of the present invention in the ilmenite beneficiation process, it may be desirable to replace the discharge valve 74 with a blind flange (not shown) during the digestion of the ilmenite due to the severe operating conditions imposed via the acid and the acid vapors introduced into the digester interior 18, as described before.

Figure 5:
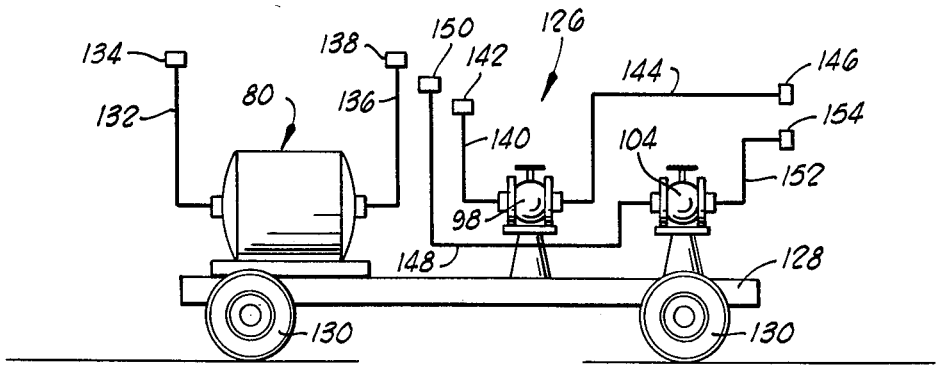
FIG. 5 is a diagrammatic, schematic view of a digester discharge assembly for discharging the digester shown in FIGS. 1 and 2 or the digester shown in FIGS. 3 and 4.

Embodiment of FIG. 5

Shown in FIG. 5 is a self-contained, mobile digester discharge assembly 126 which includes a frame 128 rollingly supported via a plurality of wheels 130 journally connected to the frame 128.

The pump 80 is mounted on the frame 128. One end of a flexible conduit 132 is connected to the suction side of the pump 80. A quick-disconnect type of coupling 134 is connected to the opposite end of the conduit 132. One end of a flexible conduit 136 is connected to the discharge side of the pump 80 and a quick-disconnect type of coupling 138 is connected to the opposite end of the conduit 136.

The first valve 98 is mounted on the frame 128 and one end of a flexible conduit 140 is connected to the first valve 98, a quick-disconnect type of coupling 142 being connected to the opposite end of the conduit 140. One end of a flexible conduit 144 is connected to the first valve 98 and a quick-disconnect type of coupling 146 is connected to the opposite end of the conduit 144.

The second valve 104 is mounted on the frame 128 and one end of a flexible conduit 148 is connected to the second valve 104, a quick-disconnect type of coupling 150 being connected to the opposite end of the conduit 148. One end of a flexible conduit 152 is connected to the second valve 104 and a quick-disconnect type of coupling 154 is connected to the opposite end of the conduit 152.

The digester discharge assembly 126 can be utilized in cooperation with the digester 10 or 10a for discharging the digested material from the digester interior 18. When it is desired to discharge the digested material from the digester 10 or 10a, the digester discharge assembly 126 is rolled to a position beneath the digester 10 or 10a. The coupling 134 is connected to the coupling 76 on the discharge nozzle 72 and the conduit 136 is connected to the surge tank 84 via the coupling 138, the conduit 132 providing fluidic communication between the discharge nozzle 72 and the suction side of the pump 80 in a manner like that described before with respect to the conduit 78 (FIG. 2) and the conduit 136 providing fluidic communication between the discharge side of the pump 80 and the surge tank 84 in a manner like that described before with respect to the conduit 82. The coupling 142 is connected to the coupling 96 on the discharge nozzle 72 and the coupling 146 is connected to the fluid source 92, thereby connecting the discharge nozzle 72 to the fluid source 92 via the first valve 98 in a manner and for reasons as described above, the conduits 140 and 144 cooperating to connect the fluid source 92 to the discharge nozzle 72 in a manner similar to that described before with respect to the conduit 94 (FIG. 2). The coupling 150 is connected to the coupling 102 on the discharge nozzle 72 and the coupling 154 is connected to the fluid source 92, thereby connecting the discharge nozzle 72 to the fluid source 92 via the second valve 104 in a manner and for reasons similar to that described before, the conduits 148 and 152 cooperating to connect the fluid source 92 to the discharge nozzle 72 in a manner like that described before with respect to the conduit 100 (FIG. 2).

After the pump 80 and the first and the second valves 98 and 104 have been connected to the discharge nozzle 72 and to the fluid source 92 or the surge tank 84 in the manner just described, the digested material is pumped from the digester interior in a manner exactly like that described before with respect to the digesters 10 and 10a. The digester discharge assembly 126 may be useful in some applications where it is desired to service a number of digesters utilizing a single pump and one set of the first and the second valves portably mounted for convenient movement to each of the digesters to be discharged.

Changes may be made in the various components and assemblies disclosed herein and in the steps of the method disclosed herein without departing from the spirit and the scope of the invention as defined in the following claims.

What is claimed is:

1. A method for operating a digester movably mounted on mounting structures in a process for the beneficiation of titaniferous iron ores wherein the digester includes a nozzle having an opening covered via a removable cover, the opening being in fluidic communication with the interior of the digester, the method comprising the steps of:

moving the digester on the mounting structures to a material receiving position in which the nozzel is disposed in a position for receiving the ores to be digested;

removing the cover from the nozzle;

charging the ores into the interior of the digester via the opening in the nozzle;

connecting the cover to the nozzle;

introducing leach liquor into the interior of the digester;

digesting the ores in the digester;

removing the spent leach liquor from the digester after digesting of the ores;

introducing a wash fluid into the interior of the digester to wash the digested ores;

moving the digester on the mounting structures to a material discharge position without first discharging the wash fluid for discharging the digested ores and the wash fluid from the digester;

connecting a pump to the nozzle on the digester;

establishing fluidic communication between the interior of the digester and the pump; and pumping the digested ores and the wash fluid from the digester via the pump.

2. The method of claim 1 wherein the step of establishing fluidic communication between the interior of the digester and the pump is defined further to include the steps of:

connecting a discharge valve to the nozzle in the digester between the pump and the digester; and opening the discharge valve to establish fluidic communication between the digester and the pump.

3. The method of claim 2 wherein, prior to the step of opening the discharge valve, the method is defined further to include the steps of:

connecting a fluid source to the pump; and pumping fluid from the fluid source through the pump for starting the pumping action of the pump prior to pumping the digested material from the interior of the digester.

4. The method of claim 2 wherein, prior to the step of connecting the pump to the opening in the digester, the method is defined further to include the steps of:

connecting a fluid source to the nozzle between the discharge valve and the digester; and passing fluid from the fluid source into the interior of the digester via the discharge nozzle for backwashing the fluid through the discharge nozzle.

5. The method of claim 1 defined further to include the steps of:

connecting a fluid source to the pump; and passing fluid from the fluid source to the pump along with the digested ores from the digester, the fluid from the fluid source being added to the flow of the digested ores from the digester to facilitate the continuous flow of the ores from the digester and through the pump.

6. A method for operating more than one movable digester in a process for the beneficiation of titaniferous iron ores wherein each digester is movably supported on mounting structures and wherein each digester includes a first nozzle having an opening in fluidic communication with the interior of the digester and a removable first cover for closing the opening in the first nozzle, and a second nozzle having an opening in fluidic communication with the interior of the digester and a discharge valve interposed in a discharge nozzle connected to the second nozzle, the method comprising the steps of:

charging each digester with ores, the charging of each digester including the steps of:

moving the digester on the mounting structures to a material receiving position in which the first nozzle is disposed in a position for receiving the ores to be digested;

charging the ores into the interior of the digester via the opening in the first nozzle; and securing the first cover over the opening in the first nozzle;

introducing leach liquor into the interior of the digesters;

digesting the ores in the digesters;

removing the spent leach liquor from the digester after digesting the ores;

introducing a wash fluid into the interior of the digesters to wash the digested ores;

moving the digesters on the mounting structures to a material discharge position without first discharging the wash fluid in which the second nozzle is in position for discharging the digested ores and the wash fluid from the digesters after the completion of the digestion;

removing the digested ores and the wash fluid from the digesters via a digester discharge assembly, the removing of the ores and the wash fluid including the steps of:

connecting the digester discharge assembly to the discharge valve of one of the digesters after moving the digester to the material discharge position;

opening the discharge valve to establish fluidic communication between the interior of the digester and the digester discharge assembly;

discharging the digested ores and the wash fluid from the digester via the digester discharge assembly;

closing the discharge valve interrupting the fluidic communication between the digester and the digester discharge assembly;

disconnecting the digester discharge assembly from the discharge valve of the digester after the discharge of the ores and the wash fluid and after the closing of the discharge valve; and moving the digester discharge assembly to each of the digesters and repeating the step of removing the digested ores and the wash fluid from each of the digesters as the digestion of ores is completed and the subsequent moving of the digesters on the mounting structures to the material discharge position.

7. The method of claim 6 wherein the digester discharge assembly includes a pump and a fluid source, and wherein the step of connecting the digester discharge assembly to the discharge valve of one of the digesters is defined further to include the steps of:

connecting the discharge valve to the pump of the digester discharge assembly;

connecting the fluid source of the digester discharge assembly to the discharge nozzle, generally between the discharge valve and the digester; and feeding fluid from the fluid source into the interior of the digester via the discharge nozzle for unclogging a portion of material lodged in the discharge nozzle and between the opening in the discharge nozzle and the interior of the digester.

8. The method of claim 7 wherein the step of connecting the digester discharge assembly to the discharge valve of one of the digesters is defined further to include the steps of:

connecting the fluid source to the pump; and pumping fluid from the fluid source through the pump prior to opening the discharge valve; and wherein the step of discharging the digested ores from the digester is defined further to include the step of:

pumping fluid from the fluid source through the pump along with the digested ores from the digester for facilitating the continuous flow of the discharging ores through the pump.

9. The method of claim 8 wherein the step of removing the digested ores from the digesters is defined further to include the step of:

pumping fluid from the fluid source through the discharge valve after the removal of the digested ores from the digester for washing materials from a portion of the discharge valve and a portion of the discharge nozzle.

10. A method for operating a digester movably mounted on mounting structures in a process for the benefication of titaniferous iron ores, wherein the digester includes a first nozzle having an opening in fluidic communication with the interior of the digester and a removable first cover for closing the opening in the first nozzle, and a second nozzle having an opening in fluidic communication with the interior of the digester and a discharge valve connected to the second nozzle, the method comprising the steps of:

moving the digester on the mounting structures to a material receiving position in which the first nozzle is disposed in a position for receiving the ores to be digested;

removing the first cover;

charging the ores to be digested into the interior of the digester via the opening in the first nozzle;

securing the first cover over the opening in the first nozzle;

introducing leach liquor into the interior of the digester;

digesting the ores in the digester;

removing the spent leach liquor from the digester after digesting the ores;

introducing a wash fluid into the interior of the digester to wash the digested ores;

moving the digester on the mounting structures to a material discharge position in which the second nozzle is disposed in a position for discharging the digested ores and the wash fluid from the digester;

connecting a pump to the discharge valve;

opening the discharge valve thereby establishing fluidic communication between the interior of the digester and the pump via the opened discharge valve;

pumping the digested ores and the wash fluid from the digester via the pump;

closing the discharge valve; and disconnecting the pump from the discharge valve.

11. The method of claim 10 wherein, prior to the step of connecting the pump to the second nozzle, the method is defined further to include the steps of:

connecting a fluid source between the discharge valve and the digester; and passing fluid from the fluid source into the interior of the digester via the second nozzle for backwashing the fluid through the second nozzle.

12. The method of claim 10 wherein, prior to the step of opening the discharge valve, the method is defined further to include the steps of:

connecting a fluid source to the pump; and pumping fluid from the fluid source through the pump for priming the pump prior to pumping the digested ores from the interior of the digester.

13. The method of claim 10 defined further to include the steps of:

connecting a fluid source to the pump; and passing a fluid from the fluid source to the pump along with the digested ores from the interior of the digester, the fluid from the fluid source being added to the flow of digested ores from the interior of the digester to facilitate the continuous flow of the digested ores from the interior of the digester and through the pump.

* * * * *